United States Patent

[11] 3,617,015

| [72] | Inventor | Floyd A. Kinder<br>China Lake, Calif. |
|---|---|---|
| [21] | Appl. No. | 765,117 |
| [22] | Filed | Oct. 4, 1968 |
| [45] | Patented | Nov. 2, 1971 |
| [73] | Assignee | The United States of America as represented by the Secretary of the Navy |

[54] HEAD-COUPLED MISSILE-AIMING DEVICE
1 Claim, 3 Drawing Figs.

[52] U.S. Cl....................................... 244/3.14
[51] Int. Cl....................................... F41g 7/10, F41g 9/00, F41g 11/00
[50] Field of Search........................... 244/3.14

[56] References Cited
UNITED STATES PATENTS

| 2,944,763 | 7/1960 | Grandgent et al. | 244/3.14 |
| 3,169,726 | 2/1965 | Jackson | 244/3.14 |
| 3,224,710 | 12/1965 | Hermann et al. | 244/3.14 |
| 3,274,552 | 9/1966 | Harmon et al. | 244/3.14 X |
| 3,406,402 | 10/1968 | Stauff et al. | 244/3.14 X |
| 3,106,371 | 10/1963 | Brannin et al. | 244/77 X |

*Primary Examiner*—Benjamin A. Borchelt
*Assistant Examiner*—Thomas H. Webb
*Attorneys*—Edgar J. Brower and Roy Miller

ABSTRACT: A device having multiple sensors which provide a voltage, responsive to the movement of the head of an aircraft pilot, proportional to an angle from the axis of the aircraft to align the tracking unit of a missile with a target to permit firing of the missile when the aircraft cannot be aligned with the target.

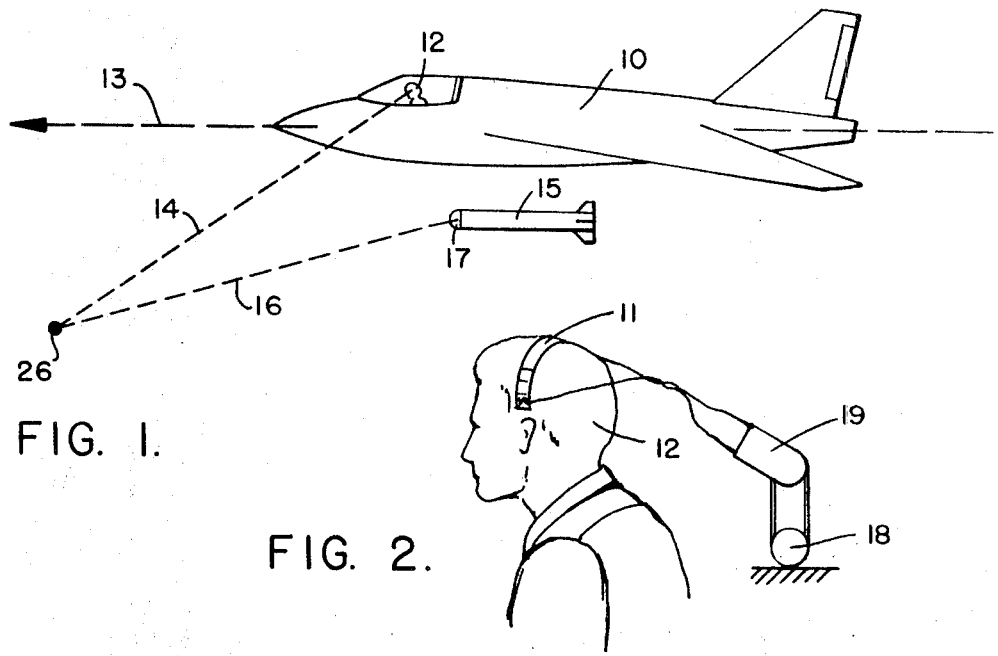
FIG. 1.
FIG. 2.
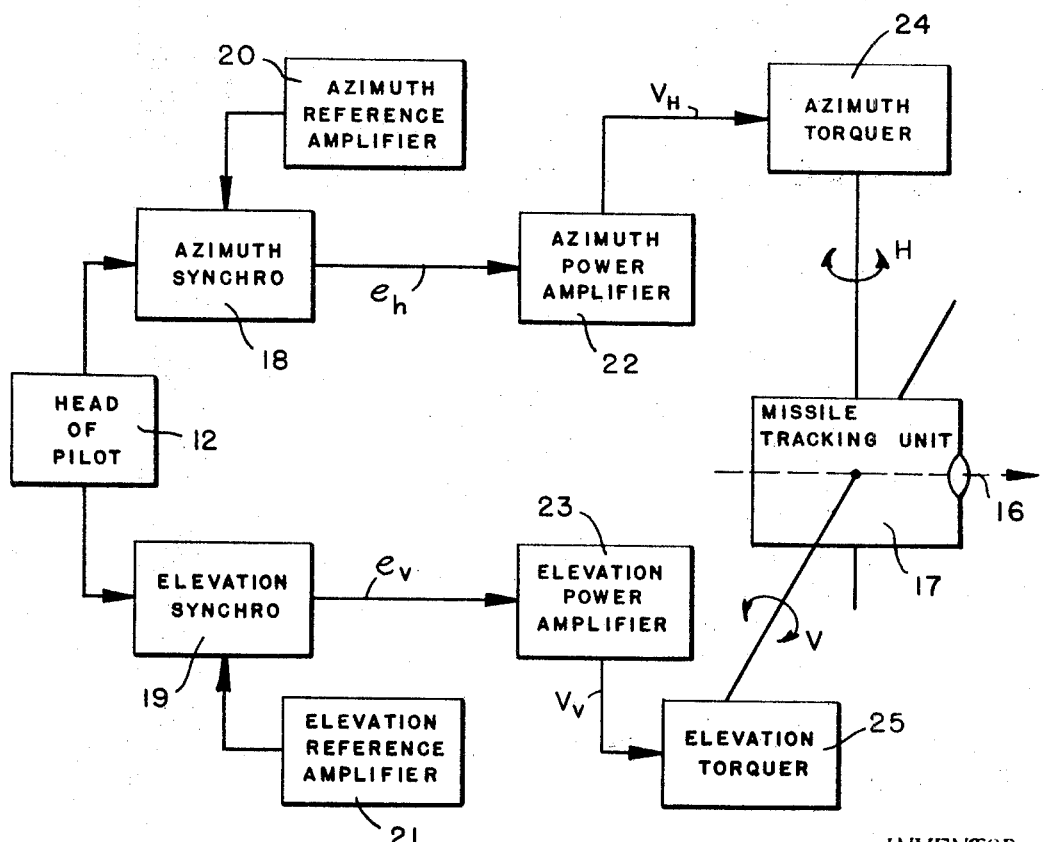
FIG. 3.
INVENTOR.
FLOYD A. KINDER
BY
ROY MILLER
ATTORNEY.

HEAD-COUPLED MISSILE-AIMING DEVICE

GOVERNMENT INTEREST

The invention described herein may be manufactured and used by or for the Government of the United States of America for governmental purposes without the payment of any royalties thereon or therefor.

BACKGROUND OF THE INVENTION

Present missile systems require that the tracking unit of the missile be aligned with its target for the missile to "lock on" so it can be fired. In combat, it is sometimes difficult to maneuver an aircraft so that the missile, which is aligned with the axis of flight of the aircraft, is correctly "locked on" to its target.

It is desirable to be able to use the natural reflexes of the pilot looking at the target to aim the missile tracking unit.

SUMMARY OF THE INVENTION

In accordance with the present invention, the direction in which the pilot is looking is detected, and a voltage proportional to the angle off the aircraft axis is generated. As the pilot turns his head to look for a target, the voltage generated, which is proportional to the angle off the aircraft axis, is used to drive torquers which point the missile tracking unit in the direction the pilot is looking.

Thus, the pilot tracks the target with his eyes, and the missile tracking unit follows the motion of the head of the pilot so that the tracking unit of the missile is "locked on" to its target when the pilot is looking at the target.

BRIEF DESCRIPTION OF THE DRAWING

FIG. 1 is a perspective view of an aircraft illustrating a preferred embodiment of the invention;

FIG. 2 is a perspective view of the head coupling portion of the invention; and

FIG. 3 is a schematic diagram of a preferred embodiment of the invention.

DESCRIPTION OF THE PREFERRED EMBODIMENTS

Referring to FIG. 1, aircraft 10 is shown flying along path 13. Aircraft 10 is equipped with a guided missile 15 having seeking unit 17 for guiding the missile to a target 26.

When the pilot 12 turns his head to look along path 14 at target 26, the invention causes missile seeking unit 17 to turn and "look" along path 16 at target 26. Since the missile is "looking" directly at the target, the missile will "lock on" to and track the target when released, even though aircraft 10 is flying along path 13.

FIG. 2 shows the pickup arrangement used to detect the movement of the head of the pilot. A headband 11, attached to the head of the pilot 12 moves in response to the head movements of the pilot. The headband is operatively connected to an azimuth synchro 18 which detects left-right movements of the head of the pilot and an elevation synchro 19 which detects up-down movements of the head of the pilot.

The schematic diagram of FIG. 3 shows the means by which missile tracking unit 17 responds to the movements of the head of the pilot 12.

Azimuth reference amplifier 20 is set so that when the pilot looks straight ahead, no signal is outputted from azimuth synchro 18. Similarly, elevation reference amplifier 21 is set so that when the pilot looks straight ahead, no signal is outputted from elevation synchro 19.

As the head of the pilot hturns, azimuth synchro 18 outputs a signal, $e$, having a magnitude proportional to the angle of the head from axis 13 of aircraft 10 and a polarity responsive to the direction of the off axis deviation. Similarly, elevation synchro 19 outputs a signal, $e_v$, having a magnitude proportional to the angle of the head from axis 13 of aircraft 10 and a polarity responsive to the direction of the off axis deviation.

Azimuth error signal $e_h$ is amplified by azimuth power amplifier 22 and the amplified signal, $V_H$, in turn drives azimuth torquer 24 which causes missile tracking unit 17 to rotate in direction H.

Elevation error signal $e_v$ is amplified by elevation power amplifier 23 and the amplified signal, $V_r$, in turn drives elevation torquer 25 which causes missile tracking unit 17 to rotate in direction V.

Thus, pilot 12 can search for targets, and missile tracking unit 17 will turn to follow the movement of the head of the pilot so that the tracking unit is "looking" at the target when the pilot is looking at the target. The missile can then be released without the pilot having to align the flight path 13 of the plane with the target.

What is claimed is:

1. A device for aligning the tracking unit of a missile with a target, said device being responsive to the movements of the head of an aircraft pilot comprising:

means for determining the angular deviation of a pilot's head with respect to a reference axis, said means including an azimuth synchro referenced so that zero output may be obtained for a preselected position and an elevation synchro referenced so that zero output may be obtained for a preselected position;

coupling means adapted to be attached to said pilot's head for coupling said pilot's head to said means for determining the angular deviation of the pilot's head with respect to a reference axis, comprising means for detecting movement in azimuth and elevation of said pilot's head, wherein said detecting means is operatively coupled to said means for determining the angular deviation of a pilot's head with respect to a reference axis;

means for aligning the tracking unit of the missile in response to said deviation of said pilot's head said means having an azimuth power amplifier connected to drive an azimuth torquer which positions the tracking unit of the missile in response to the output from the azimuth synchro, and an elevation power amplifier connected to drive an elevation torquer which positions the tracking unit of the missile in response to the output from the elevation synchro.